Aug. 4, 1925.
F. STRUG
1,548,393
SAW
Filed Feb. 7, 1925.
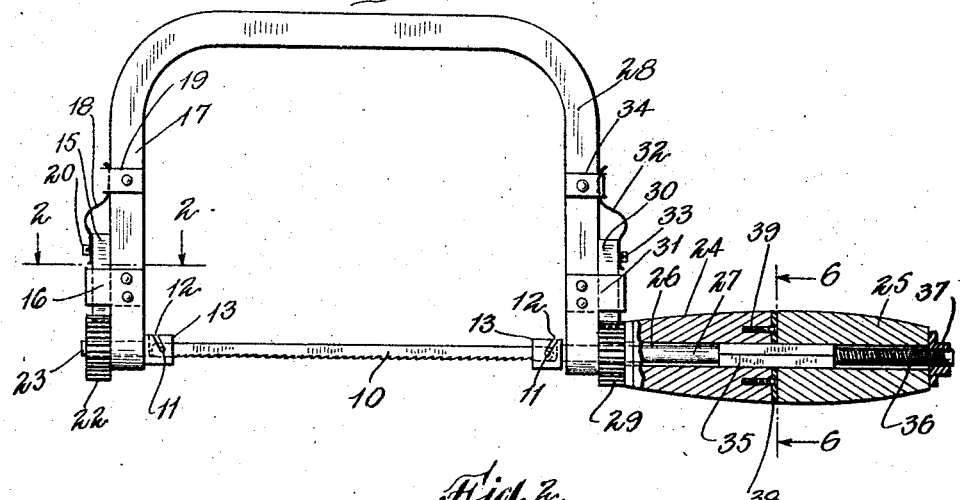
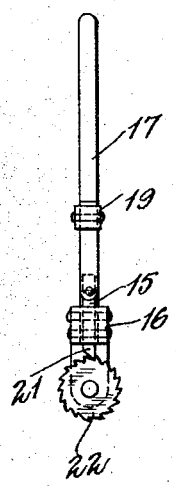
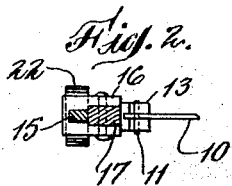
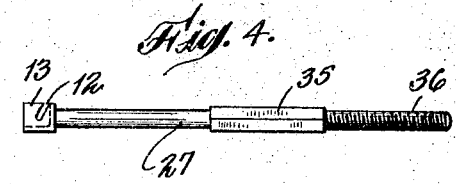
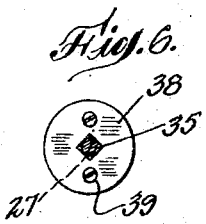
Inventor
Frank Strug, Patented Aug. 4, 1925.

1,548,393

UNITED STATES PATENT OFFICE.

FRANK STRUG, OF PHILADELPHIA, PENNSYLVANIA.

SAW.

Application filed February 7, 1925. Serial No. 7,564.

*To all whom it may concern:*

Be it known that I, FRANK STRUG, a citizen of Poland, and resident of Philadelphia, in the county of Philadelphia and State of Pennsylvania, have invented certain new and useful Improvements in Saws, of which the following is a specification.

The present invention relates to improvements in saws, particularly grooving saws, and it is the principal object of the invention to provide a hand saw allowing an adjustment of the saw blade at any desired angle to the work-piece and a locking in its adjusted position.

Another object of the invention is the provision of a saw having a handle of novel and improved construction permitting a ready separation and assembling of its parts.

A further object of the invention is the provision of a saw equipped with spring-controlled sliding pawls for locking the blade in any of its adjusted positions.

A still further object of the invention is the provision of a hand-saw of simple and therefore inexpensive construction, yet efficient in its operation.

These and further objects and advantages of my invention will become more fully apparent as the description thereof proceeds, and will then be specifically pointed out in the appended claims.

In the accompanying drawing, forming a material part of this disclosure:

Fig. 1 is a side elevation of a saw constructed according to the present invention.

Fig. 2 is a section on line 2—2 of Figure 1.

Fig. 3 is an end view of the saw.

Fig. 4 is a detail side elevation of a bar adapted to be embedded into the saw handle.

Fig. 5 is an end view thereof.

Fig. 6 is a section on line 6—6 of Figure 1.

The saw constructed according to my invention comprises a blade 10 provided with transverse pins 11 adapted to be engaged into inclined slots 12 of blocks 13 having a vertical end slot 14 for the passage of the saw blade 10 into the blocks 13.

A block 15 is held in a guide sleeve 16 against the front bar 17 of the saw bow or frame by means of a spring 18 having its upper end guided in a sleeve 19 on frame bar 17, and its lower end attached to block 15 as at 20. The lower end of block or lug 15 is formed into a pawl 21 engaging between the teeth of a ratchet wheel 22 on a short shaft 23 passing through the lower end of arm 17 and carrying at the inner face a block 13.

The saw handle is composed of two separate parts 24 and 25 having a central bore 26 into which is fitted a bar 27 which also passes through an arm 28 of the saw frame, and carries at its lower inner end a block 13, while a ratchet wheel 29 on said bar is resting against the outer face of arm 28 and is engaged by a pawl-block 30 guided through a sleeve member 31 attached to arm 28. To the upper end of pawl 30 the lower end of a spring 32 is attached as at 33, the upper end of which is guided through a guide sleeve 34 on arm 28. The bar 27 has a square part 35 intermediate its ends, and its outer end is screw-threaded as at 36, and projects beyond the outer end of handle part 25, and carries there a locking nut 37 engaging said outer handle end.

The inner face of the handle part 24 is engaged by a washer plate 38 attached to the outer end of part 24 by means of screws 39 or the like.

The handle is made in two parts in order to allow a twisting of the saw blade when sawing around corners where the frame would strike, and the square part of the bar 27 is working within washer plate 38 in order to avoid a working out of the handle by the sharp corners of the square handle part while offering a firm connection between both parts of the handle.

The device operates as follows:

If an adjustment of the saw blade to any desired angle with respect to the work-piece is desired, the pawls 15 and 30 are disengaged from wheels 22 and 29 against the action of springs 18 and 32, and the adjustment is made by adjusting the blocks 13 as desired, whereafter the parts are then locked again in their adjusted positions by engaging the pawls 15 and 30 again with wheels 22 and 29 respectively.

Changes may be made in the general arrangement of my device and in the construction of the minor details thereof without departing from the scope and spirit of the invention as specified in the appended claims.

Having thus described my invention, what I claim as new and desire to protect by Letters Patent is:

1. A saw of the class described, comprising a frame having two lateral branches, guide sleeves on said branches, shafts passing through the lower opposite ends of said branches, ratchet wheels on said shafts, pawls guided along the outer faces of said branches in said guide sleeves and adapted to engage said ratchet wheels, springs loosely guided in the upper guides on said frame and attached to said pawls normally holding said pawls in engagement with said wheels, allowing a disengagement of said pawls from said wheels, to permit an adjustment of the saw blade to any desired angle to the work-piece, and a locking of the parts in their adjusted positions.

2. A saw of the class described, comprising a frame, said frame having two lateral branches, guide sleeves on said branches, shafts passing through the lower opposite ends of said branches, ratchet wheels on said shafts, pawls guided along the outer faces of said branches in said guide sleeves, said pawls adapted to engage said ratchet wheels, springs guided in the upper guides of said frame, and attached to said pawls for normally holding said pawls in engagement with said wheels, allowing a disengagement of said pawls from said wheels, to permit an adjustment of the saw blade to any desired angle to the work piece, and a bi-partite handle allowing a twisting of said saw blade when sawing around corners, and a shaft passing through said handle having a square median part, a plate on said square part between the two handle parts for preventing chafing of the handle material during the twisting operations.

Signed at Philadelphia in the county of Philadelphia and State of Pennsylvania.

FRANK STRUG.